(12) United States Patent
Shaikh et al.

(10) Patent No.: US 10,961,885 B2
(45) Date of Patent: Mar. 30, 2021

(54) CARBON CUTTER MACHINE

(71) Applicant: P I Green Tech Solutions, Pune (IN)

(72) Inventors: Rijwan Nurul Islam Shaikh, Bhusawal (IN); Zuber Noorul Islam Shaikh, Bhusawal (IN)

(\*) Notice: Subject to any disclaimer, the term of this patent is extended or adjusted under 35 U.S.C. 154(b) by 210 days.

(21) Appl. No.: 16/300,952

(22) PCT Filed: May 9, 2017

(86) PCT No.: PCT/IN2017/050168
§ 371 (c)(1),
(2) Date: Nov. 13, 2018

(87) PCT Pub. No.: WO2017/195217
PCT Pub. Date: Nov. 16, 2017

(65) Prior Publication Data
US 2020/0318512 A1    Oct. 8, 2020

(30) Foreign Application Priority Data
May 13, 2016  (IN) .............................. 201621016689

(51) Int. Cl.
*F01N 3/01* (2006.01)
*F01N 3/027* (2006.01)
(Continued)

(52) U.S. Cl.
CPC .............. *F01N 3/0275* (2013.01); *F01N 3/01* (2013.01); *F01N 3/0214* (2013.01);
(Continued)

(58) Field of Classification Search
CPC .. B03C 3/47; B03C 3/49; B03C 3/743; B03C 3/10; F01N 3/01; F01N 3/0214;
(Continued)

(56) References Cited

U.S. PATENT DOCUMENTS

| 4,539,022 A | * | 9/1985 | McLoughlin ........... B03C 3/743 96/40 |
| 5,429,669 A | * | 7/1995 | Chang ...................... B03C 3/10 96/51 |
| 5,580,368 A | * | 12/1996 | Lu ............................. B03C 3/88 96/51 |

FOREIGN PATENT DOCUMENTS

| CN | 103585844 A | 2/2014 | |
| DE | 3707938 A1 | * 9/1988 | ......... B01D 46/0078 |

(Continued)

OTHER PUBLICATIONS

International Search Report and Written Opinion dated Aug. 16, 2017, in International Patent Application No. PCT/In2017/050168, filed May 9, 2017.

*Primary Examiner* — Jonathan R Matthias
(74) *Attorney, Agent, or Firm* — Wiley

(57) ABSTRACT

A device for reducing the emission of carbon particles from combustion of hydrocarbons, more particularly in exhaust emission of vehicles, includes a duality of electrically conducting rotating members with opposite polarities, charged with high voltage to create a corona discharge and agglomerate the ionized carbon particles. The carbon particles are cleaned using a plurality of wipers. The agglomerated carbon particles are then separated in a removable collection box or are optionally fed to a cyclone filter to be disposed. Various embodiments may be installed in existing vehicles as well as in open source pollution locations to helps control air pollution.

20 Claims, 7 Drawing Sheets

(51) Int. Cl.
    *F01N 3/021*     (2006.01)
    *F01N 3/037*     (2006.01)
    *F01N 3/08*     (2006.01)
    *B03C 3/74*     (2006.01)

(52) U.S. Cl.
    CPC ........... *F01N 3/0215* (2013.01); *F01N 3/037* (2013.01); *F01N 3/0892* (2013.01); *B03C 3/743* (2013.01); *F01N 2470/24* (2013.01); *F01N 2590/08* (2013.01)

(58) Field of Classification Search
    CPC ...... F01N 3/0215; F01N 3/0217; F01N 3/027; F01N 3/0275; F01N 3/037; F01N 3/0892; F01N 2470/24
    See application file for complete search history.

(56) References Cited

FOREIGN PATENT DOCUMENTS

| | | | | |
|---|---|---|---|---|
| EP | 2868880 A1 | * | 5/2015 | ............. F01N 3/037 |
| JP | 2015205271 A | | 11/2015 | |
| WO | WO-0144631 A1 | * | 6/2001 | ........... F01N 3/0335 |

\* cited by examiner

CARBON CUTTER MACHINE

CROSS REFERENCE TO RELATED APPLICATION

This United States Non-Provisional Patent Application is a National Stage Entry that relies on and claims priority from International Patent Application No. PCT/IN2017/50168, filed on May 9, 2017, and also relies on and claims priority from provisional Indian patent application no. 201621016689 filed in the Indian Patent Office, Mumbai on the 13 of May 2016, the entire contents of both of which are incorporated herein by reference in their entireties.

FIELD OF INVENTION

The present invention relates to a device for control and reduction of air pollution. More particularly it relates to a device that can control and prevent the emission and discharge of carbon particles into the atmosphere from sources such as, for example, exhaust from vehicles including scooters, motorcycles, buses, trucks, cars, automobiles, trains, airplanes, ships, marine vessels, emissions from diesel generator sets, flue gases from chemical process plants and industries.

In the present application, the invention is described in reference to emission from exhaust of a vehicle, by way of example. However it would be appreciated by a person skilled in the art that the invention can also be implemented in other applications where emission of carbon particles by combustion of hydrocarbons occurs and results in the problem of atmospheric pollution.

BACKGROUND AND PRIOR ART

It is well known that pollution caused by particulate carbon, (also referred to as soot), has reached alarming levels in India. It is extremely dangerous when inhaled and is a health hazard since the extent of damage depends on the size of the particulate matter. While particles of size 10 microns or more are typically captured in the lung tissue and result in respiratory diseases such as asthma, very small particles (those in the nanometer size range) are capable of passing through the lungs and into the blood and cell membranes, where they are said to cause diseases such as atherosclerosis, heart disease. Several organic compounds when adsorbed onto the surface of particulate carbon are also carcinogenic. A 2015 report by the Greenpeace said the official data showed that pollution levels in many Indian cities, including Delhi, Ahmedabad, Varanasi, Patna, Agra and Kanpur exceed famously toxic levels as compared to global counterparts such as Beijing and other Chinese cities.

Most Tier 1 and Tier 2 Indian cities have Particulate Matter (particles with a diameter<10 μm) or PM10 μg/m$^3$ and Particulate Matter (particles with a diameter<2.5 μm) or PM2.5 μg/m$^3$ levels that far exceed the prescribed norms as per WHO guidelines. The recent rule regarding odd-even vehicles on alternate days in Delhi was an attempt to address this unmet need of controlling air pollution by exhaust from vehicles.

Sometimes two-stroke scooters and mopeds are a significant source of vehicular pollution and many a times they emit more air contaminants than cars and trucks, in many cities. Apart from vehicular gaseous emissions, there are other sources of air pollution as well such as Diesel Generation sets, industries, open burning of wastes and dried harvest remains, and other sources of combustion of hydrocarbons. All these contribute to high levels of carbonaceous particulate matter in the atmosphere which is a health hazard.

One of the commonly used prior art methods involves installation of particle filters into the exhaust gas duct. However due to depositing process, the filter tends to become increasingly clogged over time which leads to a significant increase of the exhaust back pressure (filter backpressure).

U.S. Pat. No. 5,397,555 titled "Process for reducing carbon particles in exhaust gas flows" teaches a plasma process for continuous removal of carbon particles in exhaust gases flows. The invention consists of the direct oxidative conversion of carbon particles in the oxygenous medium of a free exhaust gas flow in a high-frequency induced stationary plasma zone. With respect to the technical applicability of the process for exhaust gas systems, typical high-pressure plasmas are required. This invention is costly and not practically feasible since it cannot be directly coupled to the vehicle as an add-on device.

U.S. Pat. No. 4,512,147 discloses a method and system for removing particulates from internal combustion exhaust gases. The system includes a first gas conduit which connects with an engine exhaust pipe and which communicates with a series of trap chambers containing means for filtering or trapping particulate matter present in the exhaust gas with means for heating gas passing through various conduits so as to oxidize the carbon particles. This method also is not easy to implement practically since it involves additional changes in design and increases the operating costs for heating.

U.S. Pat. No. 8,771,600 titled "Electrostatic filter and non-thermal plasma system for air pollution control of hydrocarbon combustion engines" discloses an air pollution control apparatus for cleaning exhaust gases from motor vehicles using both electrostatic precipitation and a non-thermal plasma gases. The air pollution control apparatus is configured as two pass system whereas each pass is designed as multistage horizontal plate type electrostatic precipitator and uses a direct current, consistent voltage followed by a spiked voltage, non-thermal plasma generation for the production of free radicals to oxidize toxic gases, and with the addition of a diesel oxidation catalyst to transform harmful molecular compounds in the exhaust gas into safe gases. This invention is also associated with high capital and operating costs and is not easy to implement.

Another known method in prior art uses chemical scrubbing to eliminate carbon particles in the gaseous emission.

Known prior art is associated with the problems of higher operating costs and involve high voltage power supply, consumables, chemicals and spares. Also they require to be either cleaned or replaced at regular intervals. The present invention overcomes these drawbacks.

SUMMARY OF THE INVENTION

It is therefore one of the objects of the present invention to provide a device that can drastically cut the emission of carbon particles in the exhaust, thereby controlling air pollution and accordingly reducing environmental problems.

Another object of the present invention is to provide a device which does not involve high capital or operating costs and is economical for the manufacturer as well as the end user.

A further object of the present invention is to provide a device that can be fitted as an add-on piece of equipment to existing vehicles and exhaust systems, are easy to install.

Yet another object of the present invention is to provide a device that can be installed in a common open area for purification of polluted, air laden with carbon particulate matter.

The present invention, in an embodiment suited for vehicles, comprises a device which is configured to be placed directly and permanently in the exhaust pipeline of vehicles. The device is powered by electric supply from the battery which is already present within the vehicle. The device applies high voltage to a plurality of conducting surfaces to create a corona discharge and attract the ionized carbon particles. These are then swept off by wipers that results in agglomerated carbon particles which are then separable by gravity in devices such as a cyclone filter.

As the carbon particles collect in a predetermined location, they agglomerate into a lump or layer. Due to higher weight of the lump as compared to the individual carbon particles, it does not fly away. This hardened lump is collected and separated as required and safely disposed off as land fill. The desired cleaning frequency and the size of the collection box determine when the collection box is to be emptied. The collection box may be removable or non-removable in different embodiments of the invention.

The present invention performs the process of separation continuously as the vehicle is in the running condition.

The invention does not use any consumable item such as porous filters or membranes which require cleaning or replacement and result in higher operating costs.

The device is able to capture the carbon particulate matter in the range of 85 to 95%.

On a prototype level, for a 2 wheeler, the device was manufactured at a cost of approximately Rs 5,000/- only, while for a 4 wheeler, the device was manufactured at a cost of Rs 10,000/- only. On a mass scale production, with higher economies of scale, it is expected that the price will be reduced further.

The accompanying description provided is only for the illustration purposes and variations in the same are possible without limiting the objective of the present invention.

The novel, non-obvious and economically advantageous features of the invention are as follows:
(a) the emission of carbon particulate matter into atmosphere is eliminated by a capturing and agglomerating the carbon particles in the present invention itself,
(b) the device can be manufactured at a very economical cost in a range of Rs 5,000/- to Rs 10,000/- per unit, which is expected to be further reduced if produced on a mass scale,
(c) the device can be very easily installed in an existing exhaust system of a vehicle without making major modifications to the current design or structure,
(d) the device does not involve usage of high energy source, high pressure, chemicals and consumables, or periodic replacement of parts,
(e) the device does not require a high power source and can run on the power sourced internally by the existing battery,
(f) the device is very efficient and is capable of removing up to 85 to 95% of the carbon particles in the emissions with average particles of size PM 2.5 to PM 10,
(g) the device is capable of being used for long duration and the cleaning frequency can be controlled to predetermined desired levels, with additional provision for audio-visual alarms and notifications,
(h) the device can also be used for all polluting sources of hydrocarbon emissions such as diesel generator sets, treating open source air pollution such as in crowded traffic signals, heavily polluted urban areas and rural areas where harvested fields are burnt off causing tremendous smog.

Thus a significant control of air pollution is achieved by the present invention. It not only results in considerable reduction of the carbon particles emitted into the atmosphere, but also is economical to manufacture and use, and helps to enhance the life of the combustion engine and the vehicle.

Other enhancements to the same invention may be made by incorporating necessary instrumentation and sensors to check when the collection section needs to be emptied, without departing from the scope of the invention.

Additional objects and embodiments of the invention will be set forth in part in the description which follows, and in part will become apparent to those skilled in the art upon examination of the following, or may be learned by practice of the invention. Thus, these and other objects of the present invention will be more readily apparent when considered in reference to the following description and when taken in conjunction with the accompanying drawings.

BRIEF DESCRIPTION OF THE DRAWINGS

The invention may be more readily understood by referring to the accompanying drawings, in which.

Figure 1:
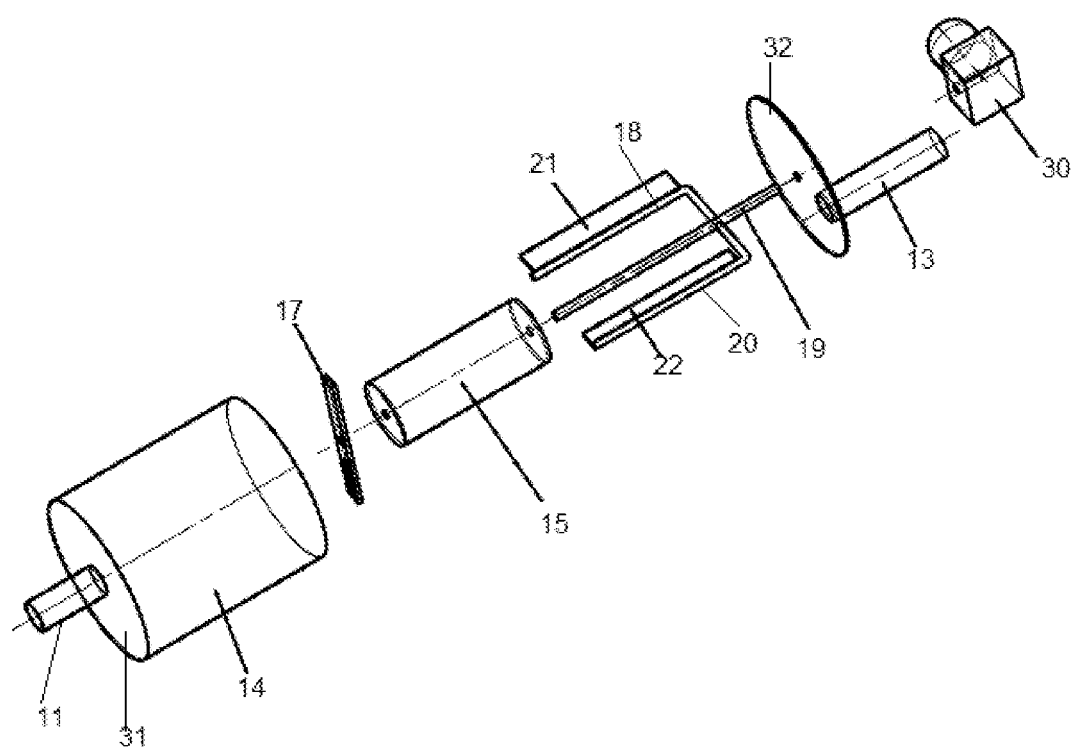
FIG. 1 depicts an exploded perspective view of the present invention in a first embodiment referred to as the Coaxial Horizontal Double Cylindrical CCM.

The legends used in the said figure and their description are described in the Table-1 herein below.

LIST OF REFERENCE NUMERALS

TABLE 1

| Legend No. | Description |
| --- | --- |
| 10 | Supporting structure assembly |
| 11 | Exhaust inlet pipe |

TABLE 1-continued

| Legend No. | Description |
| --- | --- |
| 12 | Enclosing chamber |
| 13 | Exhaust outlet pipe |
| 14 | First cylinder |
| 15 | Second cylinder |
| 16 | Plurality of carbon brushes |
| 17 | Vertical support member |
| 18 | Outer member |
| 19 | Central member |
| 20 | Inner member |
| 21 | First wiper |
| 22 | Second wiper |
| 23 | Separation chamber |
| 24 | Cyclone section |
| 25 | Collection section |
| 26 | Removable tray |
| 27 | Treated outlet pipe |
| 28 | H.V. Circuit |
| 29 | Power source (battery) |
| 30 | Motor |
| 31 | Front lid |
| 32 | Back lid |
| 33 | Rotary metallic discs |
| 34 | First disc |
| 35 | Second disc |
| 36 | Sucking tower |
| 37 | Fan |
| 38 | Inlet mesh |
| $C_{in}$ | Carbon particulate matter laden exhaust gases inflow |
| $C_{out}$ | Agglomerated carbon particle laden exhaust gases outflow |
| $C_c$ | Clean exhaust gases outflow |

DETAILED DESCRIPTION OF EMBODIMENTS OF THE INVENTION

As required, detailed embodiments of the present invention are disclosed herein. However, it is to be understood that the disclosed embodiments are merely exemplary of an invention that may be embodied in various and alternative forms. Therefore, specific functional details disclosed herein are not to be interpreted as limiting, but merely as a representative basis for the claims and/or as a representative basis for teaching one skilled in the art to variously employ the present invention.

The following description is presented to enable any person skilled in the art to make and use the invention, and is provided in the context of particular applications of the invention and their requirements.

A Carbon Cutter Machine ("CCM") as disclosed by the present invention is described in detail by way of the following exemplary embodiments. Although numerous combinations of the present embodiments can be carried out, the present invention is best described by way of the following main embodiments.

For clarity and better understanding, the following terminology shall be referred to in the present application.

A first embodiment of the CCM is referred to as the Coaxial Horizontal Double Cylindrical CCM. This embodiment is suitable for removal of carbon particulate matter from a source such as a vehicle exhaust or exhaust from a Diesel Generator (DG) set.

A second embodiment of the CCM is referred to as the Coaxial Vertical Double Cylindrical CCM. This embodiment is suitable for removal of carbon particulate matter from a source such as a vehicle exhaust or exhaust from a Diesel Generator (DG) set.

A third embodiment of the CCM is referred to as the Coaxial Horizontal Parallel Rotary Discs CCM. This embodiment is suitable for removal of carbon particulate matter from a source such as a vehicle exhaust or exhaust from a Diesel Generator (DG) set.

A fourth embodiment of the CCM is referred to as the Coaxial Vertical Parallel Rotary Discs CCM. This embodiment is suitable for removal of carbon particulate matter from a source such as a vehicle exhaust or exhaust from a Diesel Generator (DG) set.

A fifth embodiment of the CCM is for suitable for removal of carbon particulate matter from an open pollution source such as a traffic signal or an open field where organic matter is being burnt, and is referred to as the Sucking Tower CCM.

First Embodiment: Coaxial Horizontal Double Cylindrical CCM

The first embodiment is presently described with reference to FIGS. 1, 2 and 3a, 3b and 4.

Carbon particulate matter laden exhaust gases $C_{in}$ enter the CCM through an exhaust inlet pipe 11, which leads into an enclosing chamber 12, provided with an exhaust outlet pipe 13 to discharge the cleaned exhaust gases $C_{out}$. The enclosing chamber 12 is horizontally positioned and is shaped substantially as a hollow cylinder and is referred hereinafter as a first cylinder 14. The first cylinder 14 is provided with a downward slope towards the exhaust outlet pipe 13. The first cylinder 14 is provided with a front lid 31 and a back lid 32. The first cylinder 14 houses a second hollow cylinder 15, having a diameter lesser than the diameter of the first cylinder 14. The second cylinder 15 is disposed coaxially within the first cylinder 14. Both the first cylinder 14 and the second cylinder 15 are electrically conducting in nature and are charged with opposing polarities. Plurality of carbon brushes 16 (not shown in the figures) are in communication with the first cylinder 14 and the second cylinder 15 for supply of electric current.

In a preferred embodiment of the invention, the first cylinder 14 is negatively charged on its internal surface and the second cylinder 15 is positively charged on its external surface.

The second cylinder 15 is mounted on a supporting structure assembly 10 which rotates within the first cylinder 14. A stationary vertical support member 17 is non-removably attached to the first cylinder 14 and holds the supporting structure assembly 10 at one end. The supporting structure assembly 10 comprises of three parallel pipe members designated as an outer member 18, a central member 19 and an inner member 20. The central member 19 is disposed axially and non-removably within the second cylinder 15 and thereby provides support to the second cylinder 15. The central member 19 is also coupled to a motor 30 mounted on the exterior of the first cylinder 14. A wiper strip, designated as first wiper 21, made of a thermo elastomeric polymer material is non-removably affixed to a longitudinal edge of the outer member 18. A wiper strip, designated as second wiper 22, made of a thermo elastomeric polymer material is non-removably affixed to a longitudinal edge of the inner member 20.

An annular space of approximately 1 inches to 3 inches is maintained between the pair of first cylinder 14 and second cylinder 15. The rotating supporting structure 10 is coupled to a 12 V DC power source 29 which is electrically connected with HV circuit 28. The annular space is charged with 25,000 V at half wave DC to generate a corona discharge between the oppositely charged first cylinder 14 and second cylinder 15, which causes the ionized carbon particles to get deposited on the cylinders. Layers of carbon particles deposited on the charged interior surface of the first cylinder 14 and the charged exterior surface of the second cylinder 15 are cleaned by action of the wipers brushing against them.

As the supporting structure assembly 10 rotates, the first wiper 21 gently scrapes off and cleans a layer of carbon particles deposited on the internal surface of the first cylinder 14. In a similar fashion, the second wiper 22 cleans a layer of carbon particles deposited on the external surface of the second cylinder 15.

The accumulated carbon particles are thus dislodged from the internal surface of the first cylinder 14 and the external surface of the second cylinder 15 and fall to the bottom sloping floor of the enclosing chamber 12 as agglomerated carbon particles.

Figure 4:
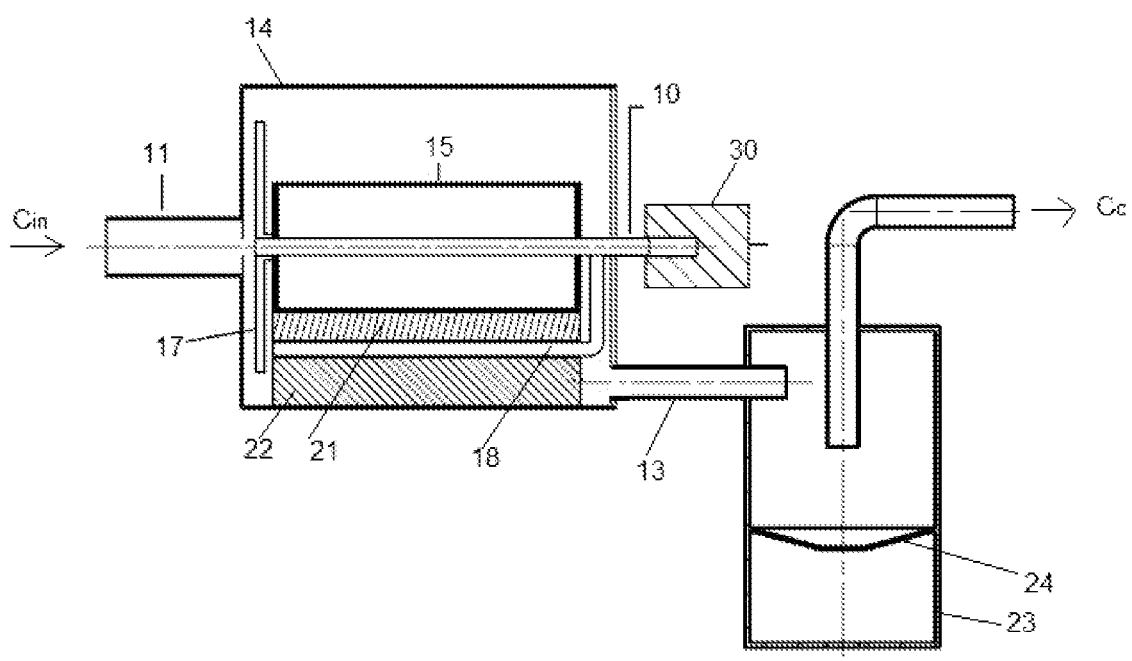
FIG. 4 depicts a view of the horizontal carbon cutter machine as described by the present invention in a first embodiment referred to as the Coaxial Horizontal Double Cylindrical CCM coupled to the cyclone section.

The agglomerated carbon particles migrate towards the outlet slope and are discharged from an exhaust outlet pipe 13. The exhaust gases $C_{out}$ carrying the agglomerated carbon particles enter a second chamber, designated as separation chamber 23 through the exhaust outlet pipe 13, as depicted in FIG. 4. The separation chamber 23 comprises of a cyclone section 24, having a treated outlet pipe 27 to discharge the clean exhaust gases $C_c$, and a collection section 25. The agglomerated carbon particles achieve sufficient mass and volume such that they are separated from the exhaust gases in the cyclone section 24.

The collection section 25 is provided in the form a removable tray 26, and is positioned below the bottom portion of the cyclone section 24, onto which the agglomerated carbon particles get separated and are collected.

An electronic control unit comprising of a microcontroller system (not shown in the accompanying drawings) is electrically linked to the motor 30 as well as power source 29 for control of the charging and cleaning cycle. After predetermined duration, say every 15 minutes, the charging and cleaning cycles can be alternately switched. It is also possible to programmatically control the cleaning cycle frequency depending on numerous factors such as—on the level of pollution control required, quality and purity of the fuel.

Thus there is intermittent cleaning and charging of the cylinders.

In alternate embodiments, only a partial surface of the cylinders may be cleaned by controlling the motion of the wipers.

In another alternate embodiment, once the weight of the agglomerated carbon particles in the removable tray of the collection section reaches a predetermined level, an alarm in the form of a visual, audio, or message alert is triggered and the driver of the vehicle is sensitized. Optionally, a message can be sent by telecommunication means to a central server.

In alternate embodiments, resilient members such as springs may be provided between the wipers.

Figure 2:
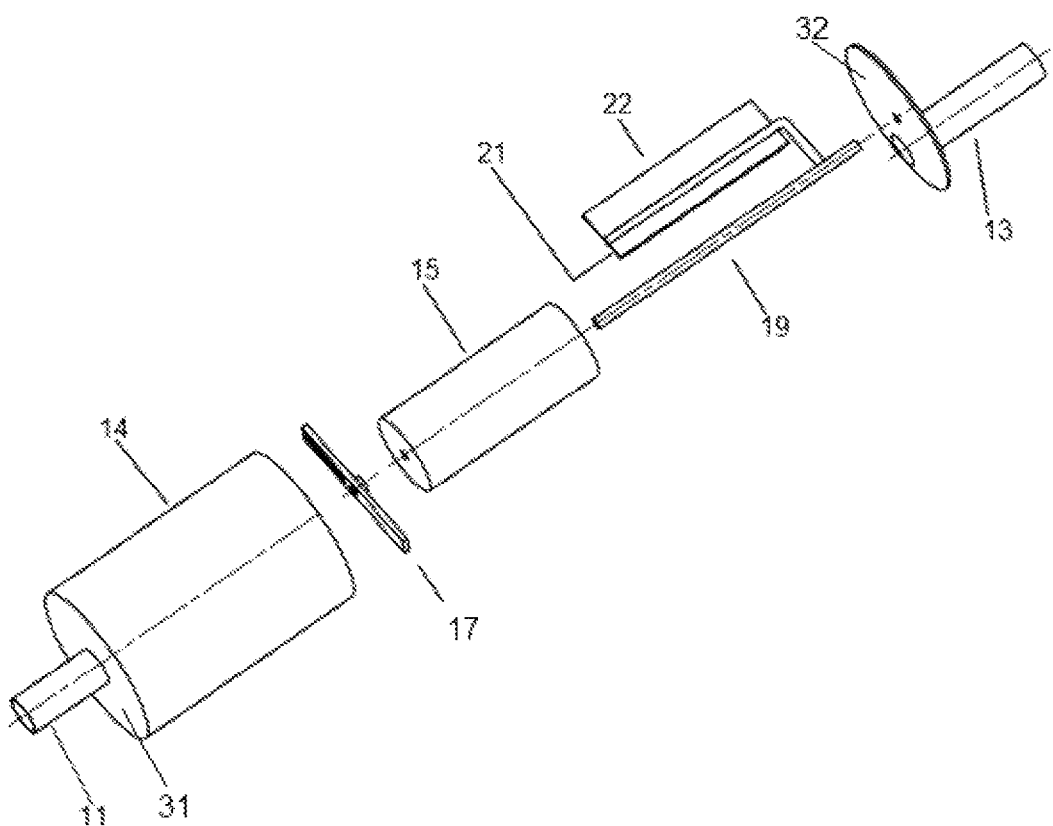
FIG. 2 depicts an exploded perspective view of the present invention in an alternate embodiment of the first embodiment referred to as the Coaxial Horizontal Double Cylindrical CCM.
Figure 3A:
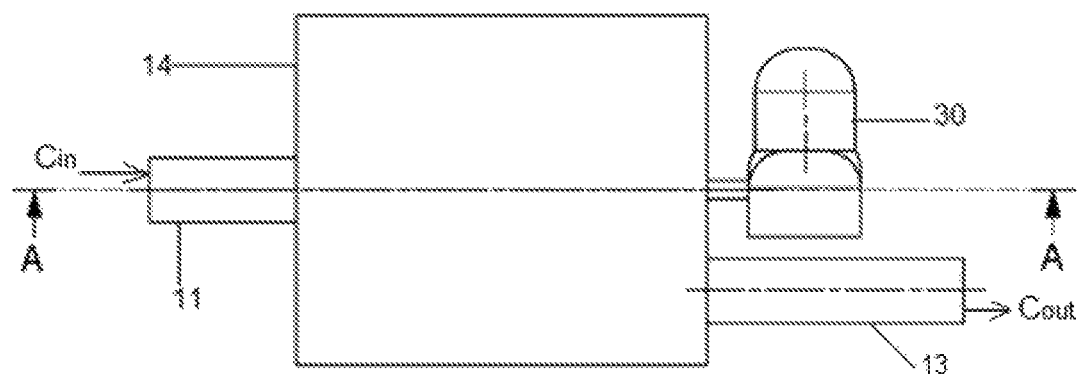
FIG. 3a depicts a side view of the horizontal carbon cutter machine as described by the present invention in a first embodiment referred to as the Coaxial Horizontal Double Cylindrical CCM.
Figure 3B:
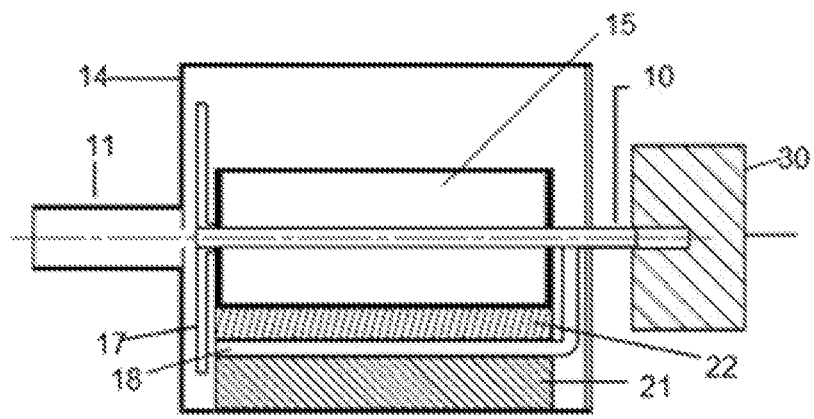
FIG. 3b depicts a sectional side view of the horizontal carbon cutter machine as described by the present invention in a first embodiment referred to as the Coaxial Horizontal Double Cylindrical CCM.

In alternate embodiments, several variations/combinations of the wiper strips attached to the supporting structure are possible. This should not be construed as limiting to the scope of the present invention. To illustrate, FIG. 1 depicts an embodiment wherein both the wiper strips are attached to an outer member and inner member of the supporting structure assembly respectively, while FIG. 2 depicts an embodiment wherein both the wiper blades are attached to a single member of the supporting structure assembly.

In a preferred embodiment, two coaxial cylinders are used. However, in alternate embodiments, it is possible to achieve desired effect by a plurality of coaxial cylinders. In alternate embodiments, a plurality of pair of two coaxial cylinders may also be used. The number of cylinders must hence not be construed as a limiting factor for the present invention.

The whole unit is of overall dimensions having approximate diameter 3 to 7 inches and approximate length of 7 to 10 inches and fits in a space near the muffler.

The material of construction for outer and inner cylinders may be a thermally conductive material such as preferably SS or MS, which can withstand high voltage and high temperature. The material of construction for the wipers may be an insulating elastomeric material that is capable of withstanding high temperature, such as Silicon rubber. The supporting structure assembly is characterized by a rigid but insulating material, such as a metal construction coated with rubber layer.

Second Embodiment: Coaxial Vertical Double Cylindrical CCM

The second embodiment is presently described with reference to FIG. 4.

Carbon particulate matter laden exhaust gases $C_{in}$ enter the CCM through an exhaust inlet pipe 11, which leads into an enclosing chamber 12, provided with an exhaust outlet pipe 13 to discharge the cleaned exhaust gases $C_{out}$. The enclosing chamber 12 is vertically positioned and is shaped substantially as a hollow cylinder and is referred hereinafter as a first cylinder 14.

The exhaust inlet pipe 11 is preferably positioned in the bottom portion of the first cylinder 14, and the exhaust outlet pipe 13 is positioned at the top portion of the first cylinder 14.

The second cylinder 15 is disposed coaxially within the first cylinder 14. Both the first cylinder 14 and the second cylinder 15 are electrically conducting in nature and are charged with opposing polarities. Plurality of carbon brushes 16 (not shown in the figures) are in communication with the first cylinder 14 and the second cylinder 15 for supply of electric current. In a preferred embodiment of the invention, the first cylinder 14 is negatively charged on its internal surface and the second cylinder 15 is positively charged on its external surface.

The second cylinder 15 is mounted on a supporting structure assembly 10 which rotates within the first cylinder 14. A stationary vertical support member 17 is non-removably attached to the first cylinder 14 and holds the supporting structure assembly 10 at one end. The supporting structure assembly 10 comprises of three parallel pipe members designated as an outer member 18, a central member 19 and an inner member 20. The central member 19 is disposed axially and non-removably within the second cylinder 15 and thereby provides support to the second cylinder 15. The central member 19 is also coupled to a motor 30 mounted on the exterior of the first cylinder 14. A wiper strip, designated as first wiper 21, made of a thermo elastomeric polymer material is non-removably affixed to a longitudinal edge of the outer member 18. A wiper strip, designated as second wiper 22, made of a thermo elastomeric polymer material is non-removably affixed to a longitudinal edge of the inner member 20.

An annular space of approximately 1 inches to 3 inches is maintained between the pair of first cylinder 14 and second cylinder 15. The rotating supporting structure 10 is coupled to a 12 V DC power source 29 which is electrically connected with HV circuit 28. The annular space is charged with 25,000 V at half wave DC to generate a corona discharge between the oppositely charged first cylinder 14 and second cylinder 15, which causes the ionized carbon particles to get deposited on the cylinders. Layers of carbon particles deposited on the charged interior surface of the first cylinder 14 and the charged exterior surface of the second cylinder 15 are cleaned by action of the wipers brushing against them.

As the supporting structure assembly 10 rotates, the first wiper 21 gently scrapes off and cleans a layer of carbon particles deposited on the internal surface of the first cylinder 14. In a similar fashion, the second wiper 22 cleans a layer of carbon particles deposited on the external surface of the second cylinder 15.

The accumulated carbon particles which are dislodged from the internal surface of the first cylinder 14 and the external surface of the second cylinder 15 by the corresponding wipers, fall into the separation chamber 23 as agglomerated carbon particles. The separation chamber 23 is directly integrated with the enclosing chamber 12 in this embodiment.

The separation chamber 23 comprises of a cyclone section 24 and a collection section 25. The agglomerated carbon particles achieve sufficient mass and volume such that they are separated from the exhaust gases in the cyclone section 24.

The collection section 25 is provided in the form a removable tray 26, and is positioned below the bottom portion of the cyclone section 24, onto which the agglomerated carbon particles get separated and are collected.

Other constructional features and functioning remains the same as that of the first embodiment of the present invention.

In alternate embodiments, only a partial surface of the cylinders may be cleaned by controlling the motion of the wipers.

In alternate embodiments, resilient members such as springs may be provided between the wipers.

In another alternate embodiment, once the weight of the agglomerated carbon particles in the removable tray of the collection section reaches a predetermined level, an alarm in the form of a visual, audio, or message alert is triggered and the driver of the vehicle is sensitized. Optionally, a message can be sent by telecommunication means to a central server.

Third Embodiment: Coaxial Horizontal Parallel Rotary Discs CCM

Figure 5:
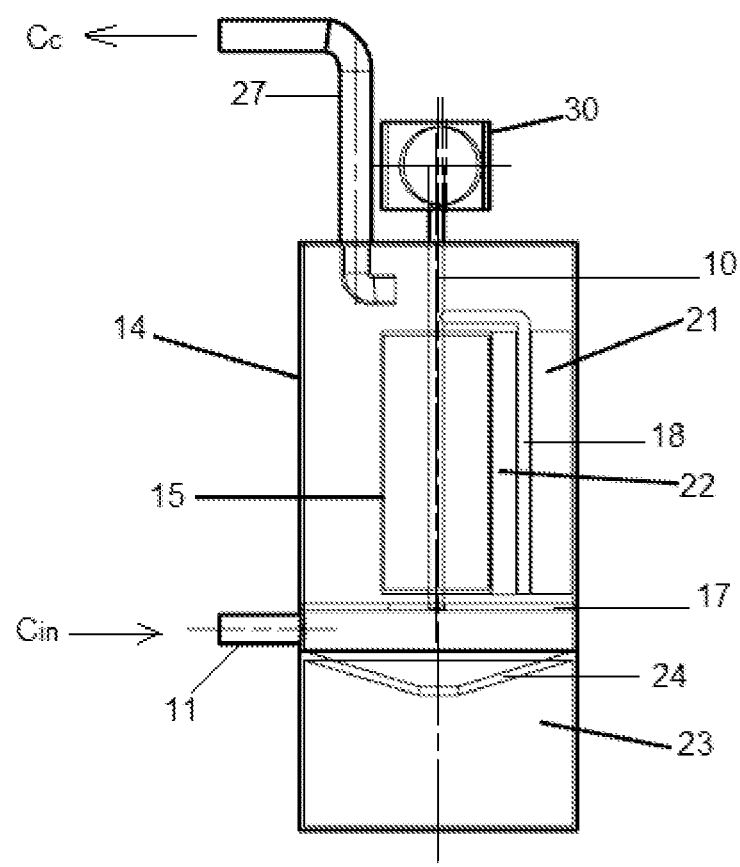
FIG. 5 depicts a sectional front view of the vertical carbon cutter machine as described by the present invention in a second embodiment referred to as the Coaxial Vertical Double Cylindrical CCM.

The second embodiment is presently described with reference to FIG. 5.

Carbon particulate matter laden exhaust gases $C_{in}$ enter the CCM through an exhaust inlet manifold, which diverges into a plurality of distribution pipes (not shown in figure) arranged in a symmetric fashion for uniform distribution of inlet gases and to dissipate the pressure drop.

The distribution pipes are housed in a stationary, horizontally positioned enclosing chamber 12, which encloses within it, a duality of rotary metallic discs or plates 33, of opposing polarities, mounted parallelly and coaxially on a rotating supporting structure 10.

The entry of $C_{in}$ into the enclosing chamber 12 is parallel to the discs 33. The rotating supporting structure is driven by means such as a pulley and is coupled to a motor 30 mounted on the exterior of the enclosing chamber 12. The pair of rotary discs are preferably circular in shape and parallel to each other with an approximate distance of 1 to 3 inches. Both the discs, designated as a first disc 34 and a second disc 35, are electrically conducting in nature and are charged with opposing polarities. Plurality of carbon brushes 16 (not shown in the figure) are in communication with first disc 34 and second disc 35 for supply of electric current. The first disc 34 and the second disc 35 are centrally mounted on the rotating, supporting structure assembly 10.

A wiper strip, designated as a first wiper 21, and a wiper strip designated as a second wiper 22, are made of a thermo elastomeric polymer material and are non-removably affixed at a predetermined position of the enclosing chamber. The first and second wiper, 21 and 22, are positioned in close contact with the first and second discs, 34 and 35, respectively to scrape off the deposited agglomerated layer of carbon particles.

The rotating supporting structure 10 is coupled to a 12 V DC motor mounted on the exterior of the enclosing chamber and the space between the rotating discs is charged with 25,000 V at half wave DC to generate a corona discharge between the discs, which causes the ionized carbon particles to agglomerate on the discs.

The carbon particles that are wiped off from the discs 34 and 35 are collected and discharged in a removable collection box or tray and the exhaust gases may be optionally fed into a cyclone filter.

The key difference as compared to first and second embodiments is that the charged discs are not stationary during the charging or cleaning cycle and rotate. On the other hand, the wipers do not rotate and are stationary.

Other constructional features and functioning remains the same as that of the first embodiment of the present invention.

In alternate embodiments, a plurality of discs can be provided. In this example, a pair of discs has been described as an illustrative example and should not be construed as a limiting factor for the present invention.

The discs may be constructed of any thermally conducting metallic material that is capable of withstanding high voltage and temperature.

In some embodiments, the device is provided with a slight inclination or gentle downward sloping, such that the separation of agglomerated carbon particles happens due to gravity and there is no need for a cyclone filter.

In alternate embodiments, only a partial surface of the cylinders may be cleaned by controlling the motion of the discs.

In another alternate embodiment, once the weight of the agglomerated carbon particles in the removable tray of the collection section reaches a predetermined level, an alarm in the form of a visual, audio, or a message alert (such as Short Messaging Service SMS alert) is triggered and the driver of the vehicle is sensitized. Optionally, a message can be sent by telecommunication means to a central server.

Fourth Embodiment: Coaxial Vertical Parallel Rotary Discs CCM

Carbon particulate matter laden exhaust gases $C_{in}$ enter the CCM through an exhaust inlet manifold, which diverges into a plurality of distribution pipes (not shown in figure) arranged in a symmetric fashion for uniform distribution of inlet gases and to dissipate the pressure drop.

The distribution pipes are housed in a stationary, vertically positioned enclosing chamber 12, which encloses within it, a duality of rotary metallic discs or plates 33, of opposing polarities, mounted parallelly and coaxially on a rotating supporting structure 10.

The entry of $C_{in}$ into the enclosing chamber 12 is perpendicular to the discs 33.

The rotating supporting structure is driven by means such as a pulley and is coupled to a motor 30 mounted on the exterior of the enclosing chamber 12. The pair of rotary discs are preferably circular in shape and parallel to each other with an approximate distance of 1 to 3 inches. Both the discs, designated as a first disc 34 and a second disc 35, are electrically conducting in nature and are charged with opposing polarities. Plurality of carbon brushes 16 (not shown in the figures) are in communication with first disc 34 and second disc 35 for supply of electric current. The first disc 34 and the second disc 35 are centrally mounted on the rotating, supporting structure assembly 10.

A wiper strip, designated as a first wiper 21, and a wiper strip, designated as second wiper 22, made of an thermo elastomeric polymer material are non-removably affixed at a predetermined position of the enclosing chamber 12. The first and second wiper, 21 and 22, are positioned in close contact with the first and second disc, 34 and 35, respectively to scrape off the deposited agglomerated layer of carbon particles.

The rotating supporting structure 10 is coupled to a 12 V DC motor mounted on the exterior of the enclosing chamber and the space between the rotating discs is charged with 25,000 V at half wave DC to generate a corona discharge between the discs, which causes the ionized carbon particles to agglomerate on the discs.

The carbon particles that are wiped off from the discs 34 and 35 are collected and discharged in a removable collection box or tray and the exhaust gases may be optionally fed into a cyclone filter.

The key difference of the third and the fourth embodiments as compared to the first and the second embodiments is that the charged discs are not stationary during the charging or cleaning cycle and rotate. On the other hand, the wipers do not rotate and are stationary.

Other constructional features and functioning remains the same as that of the first embodiment of the present invention.

In alternate embodiments, only a partial surface of the cylinders may be cleaned by controlling the motion of the wipers.

In another alternate embodiment, once the weight of the agglomerated carbon particles in the removable tray of the collection section reaches a predetermined level, an alarm in the form of a visual, audio, or message alert is triggered and the driver of the vehicle is sensitized. Optionally, a message can be sent by telecommunication means to a central server.

The most preferred or the best mode of working the present invention includes the first and the second embodiments.

Fifth Embodiment: Sucking Tower CCM

Figure 6:
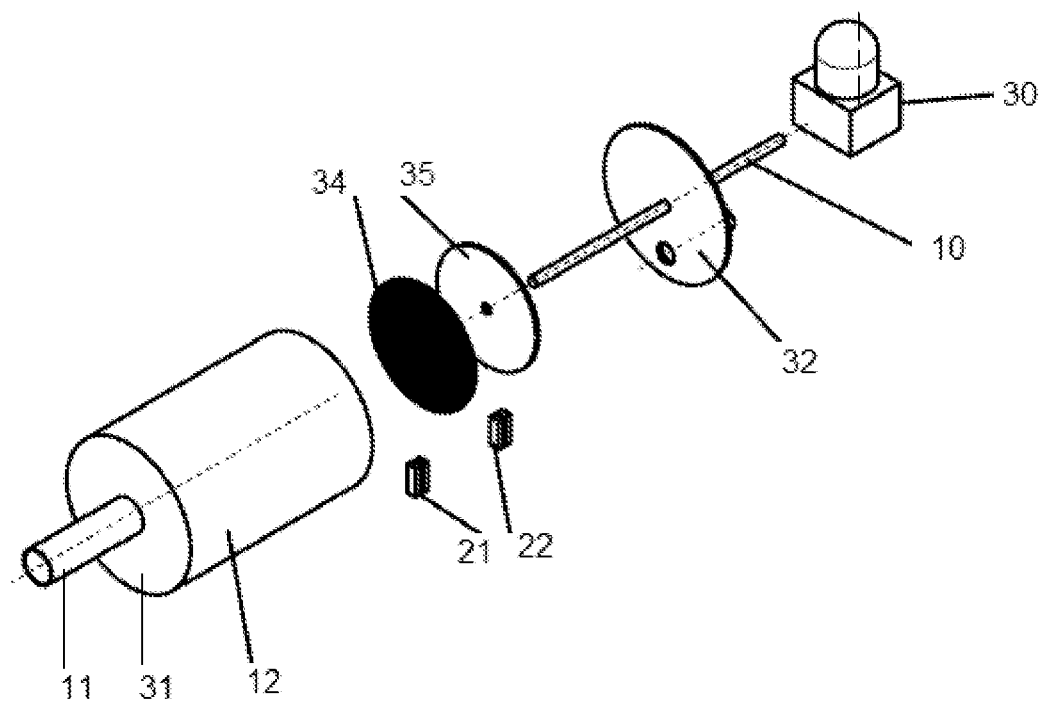
FIG. 6 depicts an exploded perspective view of the horizontal carbon cutter machine as described by the present invention in a third embodiment referred to as the Coaxial Horizontal Parallel Rotary Discs CCM.
Figure 7:
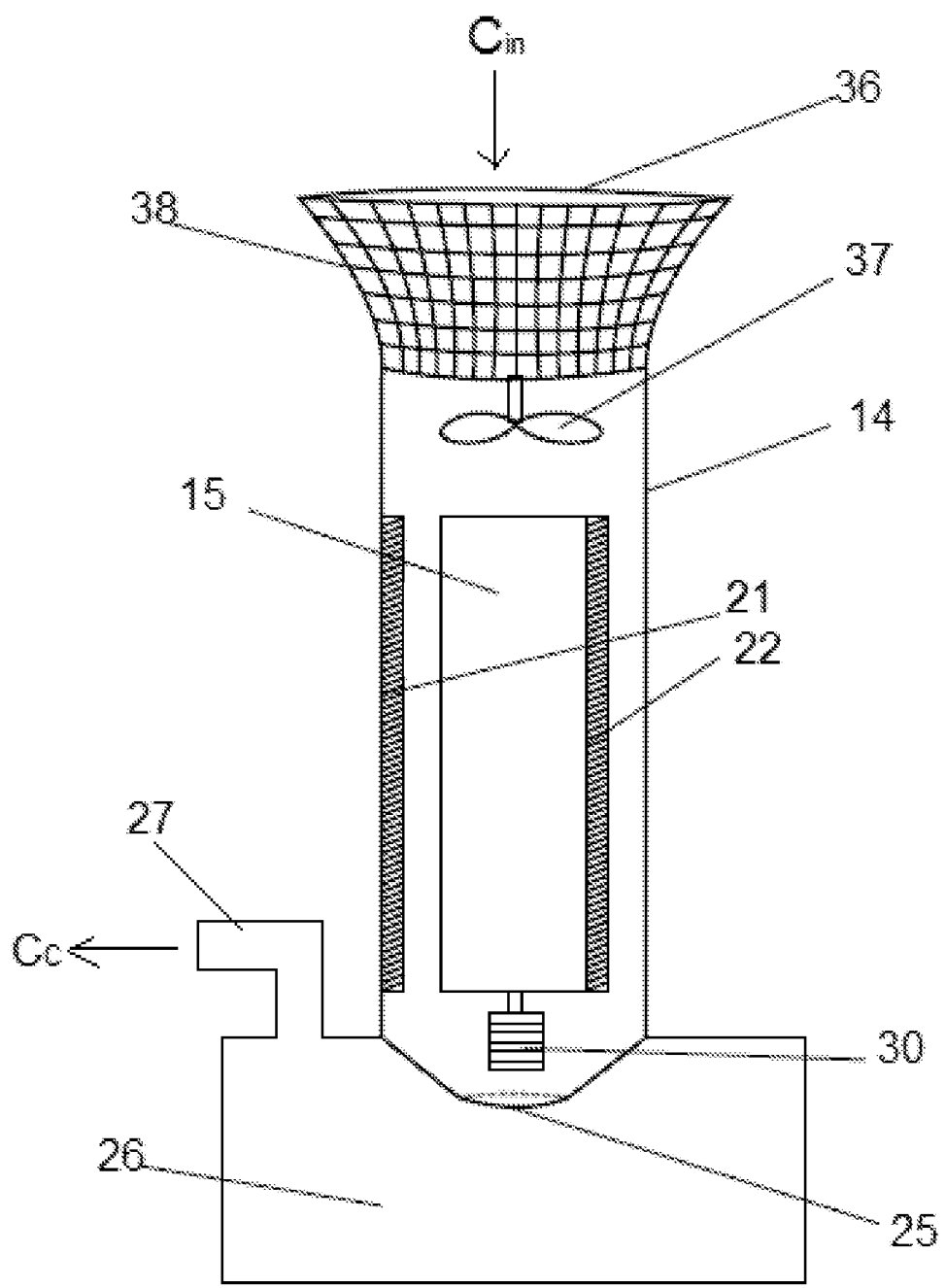
FIG. 7 depicts an embodiment of the present invention suitable for open source pollution referred to as the Sucking Tower CCM.

The fifth embodiment is presently described with reference to FIG. 6.

The fifth embodiment referred to as Sucking Tower CCM is suitable for removal of carbon particulate matter from open source pollution areas such as for example, traffic signals, open fields where remains of harvested crop are being burnt. In this embodiment, a scaled up and modified version of the Coaxial Vertical Double Cylindrical CCM is used. The device comprises of the Coaxial Vertical Double Cylindrical CCM housed within in a vertical tower 36. An induced draft fan 37 is provided on the top portion of the vertical tower 36 to suck in the carbon particulate matter laden exhaust gases $C_{in}$. A metallic inlet mesh 38 is provided at the entrance of the vertical tower 36 to keep away larger objects from entering the vertical tower 36. The carbon particulate matter laden exhaust gases $C_{in}$ are lead into a vertically positioned and substantially hollow cylinder referred hereinafter as a first cylinder 14.

The second cylinder 15 is disposed coaxially within the first cylinder 14. Both the first cylinder 14 and the second cylinder 15 are electrically conducting in nature and are charged with opposing polarities. Plurality of carbon brushes 16 (not shown in the figures) are in communication with the first cylinder 14 and the second cylinder 15 for supply of electric current.

In a preferred embodiment of the invention, the first cylinder 14 is negatively charged on its internal surface and the second cylinder 15 is positively charged on its external surface.

The second cylinder 15 is mounted on a supporting structure assembly 10 (not shown in the drawing) which rotates within the first cylinder 14. A stationary vertical support member 17 is non-removably attached to the first cylinder 14 and holds the supporting structure assembly 10 at one end. The supporting structure assembly 10 comprises of three parallel pipe members designated as an outer member 18, a central member 19 and an inner member 20. The central member 19 is disposed axially and non-removably within the second cylinder 15 and thereby provides support to the second cylinder 15. The central member 19 is also coupled to a motor 30 mounted on the exterior of the first cylinder 14. A wiper strip, designated as first wiper 21, made of a thermo elastomeric polymer material is non-removably affixed to a longitudinal edge of the outer member 18. A wiper strip, designated as second wiper 22, made of a thermo elastomeric polymer material is non-removably affixed to a longitudinal edge of the inner member 20.

An annular space of approximately 1 inches to 3 inches is maintained between the pair of first cylinder 14 and second cylinder 15. The rotating supporting structure 10 is coupled to a 12 V DC power source 29 which is electrically connected with HV circuit 28. The annular space is charged with 25,000 V at half wave DC to generate a corona discharge between the oppositely charged first cylinder 14 and second cylinder 15, which causes the ionized carbon particles to get deposited on the cylinders. Layers of carbon particles deposited on the charged interior surface of the first cylinder 14 and the charged exterior surface of the second cylinder 15 are cleaned by action of the wipers brushing against them.

As the supporting structure assembly 10 rotates, the first wiper 21 gently scrapes off and cleans a layer of carbon particles deposited on the internal surface of the first cylinder 14. In a similar fashion, the second wiper 22 cleans a layer of carbon particles deposited on the external surface of the second cylinder 15.

The accumulated carbon particles which are dislodged from the internal surface of the first cylinder 14 and the external surface of the second cylinder 15 by the corresponding wipers, fall into the separation chamber 23 as agglomerated carbon particles. The separation chamber 23 is directly integrated with the enclosing chamber 12 in this embodiment.

The separation chamber 23 comprises of a cyclone section 24 and a collection section 25. The agglomerated carbon particles achieve sufficient mass and volume such that they are separated from the exhaust gases in the cyclone section 24.

The collection section 25 is provided in the form a removable tray 26, and is positioned below the bottom portion of the cyclone section 24, onto which the agglomerated carbon particles get separated and are collected.

Other constructional features and functioning remains the same as that of the first embodiment of the present invention.

In alternate embodiments, the induced draft fan 37 may be provided at the lower portion of the vertical tower 36.

In alternate embodiments, a solar power panel is provided on top of the vertical tower 36 to rotate the supporting structure assembly which is coupled to the wiper blades.

In a preferred embodiment, the overall dimensions of the Sucking tower CCM had a height of 5 feet and diameter of 20 inches. The overall height of 4 feet included 1 feet at the top for the inlet portion and 1 feet at the lower end for the collection section.

In alternate embodiments, the Sucking tower CCM may house a plurality of CCMs in any combination and number, in accordance with any of the four embodiments, namely the Coaxial Horizontal Double Cylindrical CCM, the Coaxial Vertical Double Cylindrical CCM, the Coaxial Horizontal Parallel Rotary Discs CCM, or the Coaxial Vertical Parallel Rotary Discs CCM.

In another alternate embodiment, the Sucking tower CCM may be provided in a horizontal configuration. Such a configuration may be located on a road divider, like a horizontal pipe, parallel to or along railway tracks.

In alternate embodiments, the vertical tower 36 itself may function as the first cylinder 14.

In alternate embodiments, a notification by way of an audio alert, a visual alert, a Short Messaging Service (SMS) alert, or a combination of an audio, visual and a Short Messaging Service (SMS) alert is generated and transmitted to a user or a communication device, when the weight of the agglomerated carbon particles in the collection section reaches a predetermined level.

In alternate embodiments, the communication device may be at least one of a mobile phone, a personal computer, a smart phone, a cellular phone, a personal digital assistant (PDA), a GPS device, a smartbook, a netbook, a notebook, an ultra-mobile personal computer and a wearable computing device.

Accordingly, a device for air pollution control provided by the present invention, as disclosed in a first embodiment designated as a Coaxial Horizontal Double Cylindrical CCM, wherein carbon particulate matter present in exhaust gases generated by the combustion of hydrocarbons, is agglomerated, collected and separated and prevented from being directly emitted into the atmosphere, during the combustion, characterized by controlled steps of charging and cleaning at predetermined duration and frequency, comprises:
- a) an exhaust inlet pipe 11, leading into a first hollow cylinder 14, said first hollow cylinder 14, provided with an exhaust outlet pipe 13, a front lid 31, a back lid 32, wherein said first hollow cylinder 14 is characterized by an electrically conducting nature;
- b) a second cylinder 15, disposed coaxially within the first hollow cylinder 14, to form an annular space of pre-determined distance, wherein said cylinder 15 is characterized by an electrically conducting nature;
- c) a plurality of carbon brushes 16 in communication with the first cylinder 14 and the second cylinder 15,
- d) a high voltage power source 29, connected to the plurality of carbon brushes 16, capable of applying prescribed high voltage between said first cylinder 14 and said second cylinder 15 and charging said first cylinder and said second cylinder with opposing polarities so as to create a corona discharge,
- e) a supporting structure assembly 16, rotatably disposed within the first cylinder 14, wherein said supporting structure assembly 16, further comprising of three parallel pipe members designated as an outer member 18, a central member 19 and an inner member 20, such that the central member 19 is disposed axially and non-removably within the second cylinder 15,
- f) a power source (motor 30) mounted on the exterior of the first cylinder 14) and coupled to the central member 19 for driving the rotational movement of the supporting structure assembly 16,
- g) a stationary vertical support member 17 non-removably attached to the first cylinder 14 and connected to the supporting structure assembly 16 at one end,
- h) a first wiper 21, non-removably affixed to a longitudinal edge of the outer member 18, in contact with the external surface of second cylinder,
- i) a second wiper 22, non-removably affixed to a longitudinal edge of the inner member 20, in contact with the internal surface of cylinder, wherein the first wiper 21 and the second wiper 22 are characterized by a thermo elastomeric polymer material,
- j) a separation chamber 23, connected to the first cylinder 14 through the exhaust outlet pipe 13, wherein the separation chamber 23 further comprises a cyclone section 24, a collection section 25 and an outlet pipe 27; said collection section 25 further comprising of a removable tray 26 positioned at the lower portion, and coupled to the cyclone section 24 and said outlet pipe 27 connected to the upper portion of the cyclone section 24 for discharge of clean exhaust gases $C_c$;
- k) an electronic control unit comprising of a microcontroller system electrically linked to the motor 30 and the power source 29 for control of the charging and cleaning cycle at predetermined duration and predetermined frequency;

wherein the enclosing chamber 12 is horizontally positioned and parallel to the inflow of the exhaust gas, the first cylinder 14 and the second cylinder 15 are stationary and the first wiper 21 and the second wiper 22 rotate.

Accordingly, a device for air pollution control provided by the present invention, as disclosed in a second embodiment designated as a Coaxial Vertical Double Cylindrical CCM, wherein carbon particulate matter present in exhaust gases generated by the combustion of hydrocarbons, is agglomerated, collected and separated and prevented from being directly emitted into the atmosphere, during the combustion, characterized by controlled steps of charging and cleaning at predetermined duration and frequency, comprises:
- a) an exhaust inlet pipe 11, leading into a first hollow cylinder 14, said first hollow cylinder 14, provided with an exhaust outlet pipe 13, a front lid 31, a back lid 32, wherein said first hollow cylinder 14 is characterized by an electrically conducting nature;
- b) a second cylinder 15, disposed coaxially within the first hollow cylinder 14, to form an annular space of pre-determined distance,
  wherein said cylinder 15 is characterized by an electrically conducting nature;
- c) a plurality of carbon brushes 16 in communication with the first cylinder 14 and the second cylinder 15,
- d) a high voltage power source 29, connected to the plurality of carbon brushes 16, capable of applying prescribed high voltage between said first cylinder 14 and said second cylinder 15 and charging said first cylinder 14 and said second cylinder 15 with opposing polarities so as to create a corona discharge,
- e) a supporting structure assembly 16, rotatably disposed within the first cylinder 14, wherein said supporting structure assembly 16, further comprising of three parallel pipe members designated as an outer member 18, a central member 19 and an inner member 20, such that the central member 19 is disposed axially and non-removably within the second cylinder 15, f) a power source (motor 30) mounted on the exterior of the first cylinder) and coupled to the central member 19 for driving the rotational movement of the supporting structure assembly 16, g) a stationary vertical support member 17 non-removably attached to the first cylinder 14 and connected to the supporting structure assembly 16 at one end, h) a first wiper 21, non-removably affixed to a longitudinal edge of the outer member 18, in contact with the external surface of second cylinder, i) a second wiper 22, non-removably affixed to a longitudinal edge of the inner member 20, in contact with the internal surface of cylinder, wherein the first wiper 21 and the second wiper 22 are characterized by a thermo elastomeric polymer material, j) a separation chamber 23, integrally coupled to the lower portion of the first cylinder 14, wherein the separation chamber 23 further comprises a cyclone section 24, a collection section 25 and an outlet pipe 27;

said collection section 25 further comprising of a removable tray 26 positioned at the lower portion, and coupled to the cyclone section 24 and said outlet pipe 27 connected to the upper portion of the cyclone section 24 for discharge of clean exhaust gases $C_c$;

k) an electronic control unit comprising of a microcontroller system electrically linked to the motor 30 and the power source 29 for control of the charging and cleaning cycle at predetermined duration and predetermined frequency;

wherein the enclosing chamber 12 is vertically positioned and perpendicular to the inflow of the exhaust gas, the first cylinder 14 and the second cylinder 15 are stationary and the first wiper 21 and the second wiper 22 rotate.

Accordingly, a device for air pollution control provided by the present invention, as disclosed in a third embodiment designated as a Coaxial Horizontal Parallel Rotary Discs CCM, wherein carbon particulate matter present in exhaust gases generated by the combustion of hydrocarbons, is agglomerated, collected and separated and prevented from being directly emitted into the atmosphere, during the combustion, characterized by controlled steps of charging and cleaning at predetermined duration and frequency, comprises:

a) a stationary, horizontally positioned enclosing chamber 12, which encloses within it, a duality of rotary metallic discs 33 comprising of a first disc and a second disc, of opposing polarities, mounted parallelly and coaxially on a rotating supporting structure 10, wherein said duality of rotary metallic discs 33 are characterized by an electrically conducting nature and said duality of rotary metallic discs 33 are positioned to form an annular space of predetermined distance, b) a plurality of carbon brushes 16 in communication with the first disc and the second disc, c) a high voltage power source 29, connected to the plurality of carbon brushes 16, capable of applying prescribed high voltage between said first disc and said second disc and charging said first disc and said second disc with opposing polarities so as to create a corona discharge, d) a supporting structure assembly 16, rotatably disposed within the enclosing chamber 12, further comprising of a rotatable shaft onto which said plurality of rotary discs 33 are fixedly mounted for rotation in a plane perpendicular to said shaft, e) a power source (motor 30) mounted on the exterior of the enclosing chamber 12 for driving the rotational movement of the supporting structure assembly 16, f) a stationary vertical support member 17 non-removably attached to the supporting structure assembly 16 at one end, g) a first wiper 21, non-removably affixed to the supporting structure assembly 16, in contact with a surface of a first disc, h) a second wiper 22, non-removably affixed to the supporting structure assembly 16, in contact with a surface of a second disc, wherein the first wiper 21 and the second wiper 22 are characterized by a thermo elastomeric polymer material, i) a separation chamber 23, connected to the enclosing chamber 12 through the exhaust outlet pipe 13, wherein the separation chamber 23 further comprises a cyclone section 24, a collection section 25 and an outlet pipe 27; said collection section 25 further comprising of a removable tray 26 positioned at the lower portion, and coupled to the cyclone section 24 and said outlet pipe 27 connected to the upper portion of the cyclone section 24 for discharge of clean exhaust gases $C_c$;

j) an electronic control unit comprising of a microcontroller system electrically linked to the motor 30 and the power source 29 for control of the charging and cleaning cycle at predetermined duration and predetermined frequency;

wherein the enclosing chamber 12 is stationary and horizontally positioned and the first disc and the second disc rotate in a plane perpendicular to the inflow of the exhaust gas and the first wiper 21 and the second wiper 22 are stationary.

Accordingly, a device for air pollution control provided by the present invention, as disclosed in a fourth embodiment designated as a Coaxial Vertical Parallel Rotary Discs CCM, wherein carbon particulate matter present in exhaust gases generated by the combustion of hydrocarbons, is agglomerated, collected and separated and prevented from being directly emitted into the atmosphere, during the combustion, characterized by controlled steps of charging and cleaning at predetermined duration and frequency, comprises:

a) a stationary, vertically positioned enclosing chamber 12, which encloses within it, a duality of rotary metallic discs 33 comprising of a first disc and a second disc, of opposing polarities, mounted parallelly and coaxially on a rotating supporting structure 10, wherein said duality of rotary metallic discs 33 are characterized by an electrically conducting nature and said duality of rotary metallic discs 33 are positioned to form an annular space of predetermined distance, b) a plurality of carbon brushes 16 in communication with the first disc and the second disc, c) a high voltage power source 29, connected to the plurality of carbon brushes 16, capable of applying prescribed high voltage between said first disc and said second disc and charging said first disc and said second disc with opposing polarities so as to create a corona discharge, d) a supporting structure assembly 16, rotatably disposed within the enclosing chamber 12, further comprising of a rotatable shaft onto which said plurality of rotary discs 33 are fixedly mounted for rotation in a plane perpendicular to said shaft,
e) a power source (motor 30) mounted on the exterior of the enclosing chamber 12 for driving the rotational movement of the supporting structure assembly 16,
f) a stationary horizontal support member 17 non-removably attached to the supporting structure assembly 16 at one end,
g) a first wiper 21, non-removably affixed to the supporting structure assembly 16, in contact with a surface of a first disc,
h) a second wiper 22, non-removably affixed to the supporting structure assembly 16, in contact with a surface of a second disc,
wherein the first wiper 21 and the second wiper 22 are characterized by a thermo elastomeric polymer material,
i) a separation chamber 23, integrally coupled to the lower portion of the first cylinder 14, wherein the separation chamber 23 further comprises a cyclone section 24, a collection section 25 and an outlet pipe 27;
said collection section 25 further comprising of a removable tray 26 positioned at the lower portion, and coupled to the cyclone section 24 and said outlet pipe 27 connected to the upper portion of the cyclone section 24 for discharge of clean exhaust gases $C_c$;
j) an electronic control unit comprising of a microcontroller system electrically linked to the motor 30 and the power source 29 for control of the charging and cleaning cycle at predetermined duration and predetermined frequency;
wherein the enclosing chamber 12 is stationary and vertically positioned and the first disc and the second disc rotate in a plane parallel to the inflow of the exhaust gas and the first wiper 21 and the second wiper 22 are stationary.

Accordingly, a device for air pollution control provided by the present invention, as disclosed in a fifth embodiment designated as a Sucking Tower CCM, wherein carbon particulate matter present in exhaust gases generated in a open source pollution, is agglomerated, collected and separated and prevented from being directly emitted into the atmosphere, characterized by controlled steps of charging and cleaning at predetermined duration and frequency, comprises:
a) a vertical tower 36 provided with an inlet mesh 38, an induced draft fan 37, a first hollow cylinder 14,
wherein said first hollow cylinder 14 is characterized by an electrically conducting nature and is housed in the central position of the vertical tower 36;
b) a second cylinder 15, disposed coaxially within the first hollow cylinder 14, to form an annular space of predetermined distance,
wherein said cylinder 15 is characterized by an electrically conducting nature;
c) a plurality of carbon brushes 16 in communication with the first cylinder 14 and the second cylinder 15,
d) a high voltage power source 29, connected to the plurality of carbon brushes 16, capable of applying prescribed high voltage between said first cylinder 14 and said second cylinder 15 and charging said first cylinder 14 and said second cylinder 15 with opposing polarities so as to create a corona discharge,
e) a supporting structure assembly 16, rotatably disposed within the first cylinder 14, wherein said supporting structure assembly 16, further comprising of three parallel pipe members designated as an outer member 18, a central member 19 and an inner member 20, such that the central member 19 is disposed axially and non-removably within the second cylinder 15,
f) a power source (motor 30) coupled to the central member 19 for driving the rotational movement of the supporting structure assembly 16,
g) a stationary vertical support member 17 non-removably attached to the first cylinder 14 and connected to the supporting structure assembly 16 at one end,
h) a first wiper 21, non-removably affixed to a longitudinal edge of the outer member 18, in contact with the external surface of second cylinder,
i) a second wiper 22, non-removably affixed to a longitudinal edge of the inner member 20, in contact with the internal surface of cylinder,
wherein the first wiper 21 and the second wiper 22 are characterized by a thermo elastomeric polymer material,
l) a separation chamber 23, integrally coupled to the lower portion of the first cylinder 14, wherein the separation chamber 23 further comprises a cyclone section 24, a collection section 25 and an outlet pipe 27;
said collection section 25 further comprising of a removable tray 26 positioned at the lower portion, and coupled to the cyclone section 24 and said outlet pipe 27 connected to the upper portion of the cyclone section 24 for discharge of clean exhaust gases $C_c$;
j) an electronic control unit comprising of a microcontroller system electrically linked to the motor 30 and the power source 29 for control of the charging and cleaning cycle at predetermined duration and predetermined frequency;
wherein the sucking tower 36 is vertically positioned and perpendicular to the inflow of the exhaust gas, the first cylinder 14 and the second cylinder 15 are stationary and the first wiper 21 and the second wiper 22 rotate.

Table-2 below provides a summary of the experimental data based on the trials wherein the present invention was coupled with different sources such as vehicles and Diesel Generator (DG) sets.

TABLE 2

| | | | | | |
|---|---|---|---|---|---|
| | | | | Experimental Data | |
| S. No. | Vehicle | Year of manufacture | Test condition | Duration of test operation | Emissions of heavy vehicle as per BS standards (in gm/km) | Carbon particulate matter separated |
| 1. | TRUCK | 1995 | STANDBY | 60 MIN. | — | 3.4 gm |
| 2. | TRUCK | 1995 | RUNNING | 50 KM | | 7.95 gm |
| 3. | TRUCK | 2002 | STANDBY | 60 MIN. | | 2.39 gm |
| 4. | TRUCK | 2002 | RUNNING | 50 KM | | 4.80 gm |

TABLE 2-continued

Experimental Data

| S. No. | Vehicle | Year of manufacture | Test condition | Duration of test operation | | Emissions of heavy vehicle as per BS standards (in gm/km) | Carbon particulate matter separated |
|---|---|---|---|---|---|---|---|
| 5. | TRUCK | 2014 | STANDBY | 60 | MIN. | 0.026 | 1.02 gm |
| 6. | TRUCK | 2014 | RUNNING | 50 | KM | 0.026 | 3.90 gm |
| 7. | APE | 2007 | STANDBY | 60 | MIN. | 0.10 | 4.22 gm |
| 8. | APE | 2007 | RUNNING | 50 | KM | 0.10 | 6.37 gm |
| 9. | APE | 2012 | STANDBY | 60 | MIN. | 0.05 | 2.43 gm |
| 10. | APE | 2012 | RUNNING | 50 | KM | 0.05 | 3.75 gm |
| 11. | CAR | 2008 | STANDBY | 60 | MIN. | 0.050 | 1.47 gm |
| 12. | CAR | 2008 | RUNNING | 50 | km | 0.050 | 4.2 gm |
| 13. | CAR | 2016 | STANDBY | 60 | MIN. | 0.025 | 0.37 gm |
| 14. | CAR | 2016 | RUNNING | 50 | Km | 0.025 | 0.81 gm |
| 15. | DG set Model - KG1-30 WS, Rated output 30.9 KW, 50 Hz frequency, 65 L fuel tank capacity | 2010 | RUNNING | 30 | min | | 1.80 gm |

As seen from above the results, the present invention has collected more than the expected quantity of the particulate matter so as to meet the BS standard emission norms for 50 kms.

Some of the key factors that affect vehicle emissions are
Fuel Quality
Weight
Maintenance
Traffic
Road Emission Table

| Indian Standards | Emissions of heavy vehicle as per BS standards (in gms) | Particulate matter stored by CCM (in gms) | Emission after attaching CCM to vehicle (in gms) |
|---|---|---|---|
| BS III | 0.026 | 0.023 | 0.003 |
| BS IV | 0.005 | 0.004 | 0.001 |
| BS VI | 0.002 | — | — |

On attaching CCM to existing BS II vehicles BS Standard emission 0.039 (Buses, Trucks and Other heavy vehicles), we can comply with the emissions standard of BS IV.

Technical Advances

The present disclosure described herein above has several technical advantages including, but not limited to, control of emission of carbon particulate matter from various emission sources:

(a) the emission of carbon particulate matter into atmosphere is eliminated by a capturing and agglomerating the carbon particles in the present invention itself, (b) the invention can be manufactured at a very economical cost in a range of Rs 5,000/- to Rs 10,000/- per unit, which is expected to be further reduced if produced on a mass scale, (c) the invention can be very easily installed in an existing exhaust system of a vehicle without making major modifications to the current design or structure, (d) the invention does not involve usage of high energy source, high pressure, chemicals and consumables, or periodic replacement of parts, (e) the invention does not require a high power source and can run on the power sourced internally by the existing battery, (f) the invention is very efficient and is capable of removing upto 85 to 95% of the carbon particles in the emissions with average particles of size PM 2.5 to PM 10, (g) the invention is capable of being used for long duration and the cleaning frequency can be controlled to pre-determined desired levels, with additional provision for audio-visual alarms and notifications, (h) the invention can also be used for all polluting sources of hydrocarbon emissions such as diesel generator sets, treating open source air pollution such as in crowded traffic signals, heavily polluted urban areas and rural areas where harvested fields are burnt off causing tremendous smog.

The embodiments herein and the various features and advantageous details thereof are explained with reference to the non-limiting embodiments in the following description. Descriptions of well-known components and processing techniques are omitted so as to not unnecessarily obscure the embodiments herein. The examples used herein are intended merely to facilitate an understanding of ways in which the embodiments herein may be practiced and to further enable those of skill in the art to practice the embodiments herein. Accordingly, the examples should not be construed as limiting the scope of the embodiments herein.

The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the spirit and scope of the embodiments as described herein.

Throughout this specification the word "comprise," or variations such as "comprises" or "comprising", will be understood to imply the inclusion of a stated element, integer or step, or group of elements, integers or steps, but not the exclusion of any other element, integer or step, or group of elements, integers or steps.

The use of the expression "at least" or "at least one" suggests the use of one or more elements or ingredients or quantities, as the use may be in the embodiment of the disclosure to achieve one or more of the desired objects or results.

Any discussion of documents, acts, materials, devices, articles or the like that has been included in this specification is solely for the purpose of providing a context for the disclosure. It is not to be taken as an admission that any or all of these matters form a part of the prior art base or were common general knowledge in the field relevant to the disclosure as it existed anywhere before the priority date of this application.

The numerical values mentioned for the various physical parameters, dimensions or quantities are only approximations and it is envisaged that the values higher/lower than the numerical values assigned to the parameters, dimensions or quantities fall within the scope of the disclosure, unless there is a statement in the specification specific to the contrary.

Even though numerous characteristics and advantages of the present invention have been set forth in the foregoing description, together with details of the structure and function of the invention, the disclosure is illustrative only. Changes may be made in detail, especially in matters of shape, size, and arrangement of parts within the principles of the invention to the full extent indicated by the broad general meaning of the terms in which the appended claims are expressed.

Various modifications to the disclosed embodiments will be readily apparent to those skilled in the art and the general principles defined herein may be applied to other embodiments and applications without departing from the spirit and scope of the present invention. Thus, the present invention is not intended to be limited to the embodiments shown but is to be accorded the widest scope consistent with the principles and features disclosed herein.

What is claimed is:

1. A device for air pollution control, wherein carbon particulate matter present in exhaust gases generated by the combustion of hydrocarbons, is agglomerated, collected and separated and prevented from being directly emitted into the atmosphere, during the combustion, having controlled steps of charging and cleaning at predetermined duration and frequency, comprising:
    a) an exhaust inlet pipe, leading into a first hollow cylinder, said first hollow cylinder provided with an exhaust outlet pipe, a front lid, and a back lid, wherein said first hollow cylinder has an electrically conducting nature;
    b) a second cylinder, disposed coaxially within the first hollow cylinder, to form an annular space of predetermined distance, wherein said cylinder has an electrically conducting nature;
    c) a plurality of carbon brushes in communication with the first cylinder and the second cylinder,
    d) a high voltage power source, connected to the plurality of carbon brushes, capable of applying prescribed high voltage between said first cylinder and said second cylinder and charging said first cylinder and said second cylinder with opposing polarities to create a corona discharge,
    e) a supporting structure assembly rotatably disposed within the first cylinder, wherein said supporting structure assembly further comprises three parallel pipe members designated as an outer member, a central member and an inner member, such that the central member is disposed axially and non-removably within the second cylinder,
    f) a power source mounted on the exterior of the first cylinder and coupled to the central member for driving the rotational movement of the supporting structure assembly,
    g) a stationary vertical support member non-removably attached to the first cylinder and connected to the supporting structure assembly at one end,
    h) a first wiper, non-removably affixed to a longitudinal edge of the outer member, in contact with an external surface of the second cylinder,
    i) a second wiper, non-removably affixed to a longitudinal edge of the inner member, in contact with an internal surface of the first cylinder,
        wherein the first wiper and the second wiper comprise a thermo elastomeric polymer material,
    j) a separation chamber, connected to the first cylinder through the exhaust outlet pipe, wherein the separation chamber further comprises a cyclone section, a collection section and an outlet pipe;
        said collection section further comprising a removable tray positioned at the lower portion, and coupled to the cyclone section and said outlet pipe connected to the upper portion of the cyclone section for discharge of clean exhaust gases; and
    k) an electronic control unit comprising of a microcontroller system electrically linked to the motor and the power source for control of the charging and cleaning cycle at predetermined duration and predetermined frequency;
    wherein the first cylinder is horizontally positioned and parallel to the inflow of the exhaust gas, the first cylinder and the second cylinder are stationary and the first wiper and the second wiper rotate.

2. The device as claimed in claim 1, wherein the device is adapted to generate a notification by way of an audio alert, a visual alert, a Short Messaging Service (SMS) alert, or a combination of an audio, visual and a Short Messaging Service (SMS) alert and transmit the notification to a user or a communication device, when the weight of the agglomerated carbon particles in the collection section reaches a predetermined level.

3. The device as claimed in claim 2, wherein the communication device comprises at least one of a mobile phone, a personal computer, a smart phone, a cellular phone, a personal digital assistant (PDA), a GPS device, a smartbook, a netbook, a notebook, an ultra-mobile personal computer and a wearable computing device.

4. The device as claimed in claim 1, wherein the power source receives power from a renewable energy source including solar or wind energy.

5. A device for air pollution control, wherein carbon particulate matter present in exhaust gases generated by the combustion of hydrocarbons, is agglomerated, collected and separated and prevented from being directly emitted into the atmosphere, during the combustion, having controlled steps of charging and cleaning at predetermined duration and frequency, comprising:
- a) an exhaust inlet pipe, leading into a first hollow cylinder, said first hollow cylinder provided with an exhaust outlet pipe, a front lid, and a back lid,
  wherein said first hollow cylinder has an electrically conducting nature;
- b) a second cylinder, disposed coaxially within the first hollow cylinder, to form an annular space of predetermined distance,
  wherein said cylinder has an electrically conducting nature;
- c) a plurality of carbon brushes in communication with the first cylinder and the second cylinder,
- d) a high voltage power source, connected to the plurality of carbon brushes, capable of applying prescribed high voltage between said first cylinder and said second cylinder and charging said first cylinder and said second cylinder with opposing polarities to create a corona discharge,
- e) a supporting structure assembly rotatably disposed within the first cylinder, wherein said supporting structure assembly further comprises three parallel pipe members designated as an outer member, a central member and an inner member, such that the central member is disposed axially and non-removably within the second cylinder,
- f) a power source mounted on the exterior of the first cylinder and coupled to the central member for driving the rotational movement of the supporting structure assembly,
- g) a stationary vertical support member non-removably attached to the first cylinder and connected to the supporting structure assembly at one end,
- h) a first wiper, non-removably affixed to a longitudinal edge of the outer member, in contact with an external surface of the second cylinder,
- i) a second wiper, non-removably affixed to a longitudinal edge of the inner member, in contact with an internal surface of the first cylinder,
  wherein the first wiper and the second wiper comprise a thermo elastomeric polymer material,
- j) a separation chamber, integrally coupled to the lower portion of the first cylinder, wherein the separation chamber further comprises a cyclone section, a collection section and an outlet pipe;
  said collection section further comprising a removable tray positioned at the lower portion, and coupled to the cyclone section and said outlet pipe connected to the upper portion of the cyclone section for discharge of clean exhaust gases, and
- k) an electronic control unit comprising of a microcontroller system electrically linked to the motor and the power source for control of the charging and cleaning cycle at predetermined duration and predetermined frequency,
wherein the first cylinder is vertically positioned and perpendicular to the inflow of the exhaust gas, the first cylinder and the second cylinder are stationary and the first wiper and the second wiper rotate.

6. The device as claimed in claim 5, wherein the device is adapted to generate a notification by way of an audio alert, a visual alert, a Short Messaging Service (SMS) alert, or a combination of an audio, visual and a Short Messaging Service (SMS) alert and transmit the notification to a user or a communication device, when the weight of the agglomerated carbon particles in the collection section reaches a predetermined level.

7. The device as claimed in claim 6, wherein the communication device comprises at least one of a mobile phone, a personal computer, a smart phone, a cellular phone, a personal digital assistant (PDA), a GPS device, a snartbook, a netbook, a notebook, an ultra-mobile personal computer and a wearable computing device.

8. The device as claimed in claim 5, wherein the power source receives power from a renewable energy source including solar or wind energy.

9. A device for air pollution control, wherein carbon particulate matter present in exhaust gases generated by the combustion of hydrocarbons, is agglomerated, collected and separated and prevented from being directly emitted into the atmosphere, during the combustion, having controlled steps of charging and cleaning at predetermined duration and frequency, comprising:
- a) a stationary, horizontally positioned enclosing chamber, which encloses a duality of rotary metallic discs comprising a first disc and a second disc, with opposing polarities,
  wherein said duality of rotary metallic discs has an electrically conducting nature and said duality of rotary metallic discs are positioned to form an annular space of predetermined distance,
- b) a plurality of carbon brushes in communication with the first disc and the second disc,
- c) a high voltage power source, connected to the plurality of carbon brushes, capable of applying prescribed high voltage between said first disc and said second disc and charging said first disc and said second disc with opposing polarities to create a corona discharge,
- d) a supporting structure assembly, rotatably disposed within the enclosing chamber, further comprising of a rotatable shaft onto which said duality of rotary metallic discs are fixedly mounted for rotation in a plane perpendicular to said shaft, parallely and coaxially,
- e) a power source mounted on the exterior of the enclosing chamber for driving the rotational movement of the supporting structure assembly,
- f) a stationary vertical support member non-removably attached to the supporting structure assembly at one end,
- g) a first wiper, non-removably affixed to the supporting structure assembly, in contact with a surface of the first disc,
- h) a second wiper, non-removably affixed to the supporting structure assembly, in contact with a surface of the second disc,
  wherein the first wiper and the second wiper comprise a thermo elastomeric polymer material,
- i) a separation chamber, connected to the enclosing chamber through an exhaust outlet pipe, wherein the separation chamber further comprises a cyclone section, a collection section and an outlet pipe;
  said collection section further comprising a removable tray positioned at the lower portion, and coupled to the cyclone section and said outlet pipe connected to the upper portion of the cyclone section for discharge of clean exhaust gases; and
- j) an electronic control unit comprising of a microcontroller system electrically linked to the motor and the power source for control of the charging and cleaning cycle at predetermined duration and predetermined frequency;

wherein the enclosing chamber is stationary and horizontally positioned and the first disc and the second disc rotate in a plane perpendicular to the inflow of the exhaust gas and the first wiper and the second wiper are stationary.

10. The device as claimed in claim 9, wherein the device is adapted to generate a notification by way of an audio alert, a visual alert, a Short Messaging Service (SMS) alert, or a combination of an audio, visual and a Short Messaging Service (SMS) alert and transmit the notification to a user or a communication device, when the weight of the agglomerated carbon particles in the collection section reaches a predetermined level.

11. The device as claimed in claim 10, wherein the communication device comprises at least one of a mobile phone, a personal computer, a smart phone, a cellular phone, a personal digital assistant (PDA), a GPS device, a snartbook, a netbook, a notebook, an ultra-mobile personal computer and a wearable computing device.

12. The device as claimed in claim 9, wherein the power source receives power from a renewable energy source including solar or wind energy.

13. A device for air pollution control, wherein carbon particulate matter present in exhaust gases generated by the combustion of hydrocarbons, is agglomerated, collected and separated and prevented from being directly emitted into the atmosphere, during the combustion, having controlled steps of charging and cleaning at predetermined duration and frequency, comprising:
  a) a stationary, vertically positioned enclosing chamber, which encloses a duality of rotary metallic discs comprising of a first disc and a second disc, with opposing polarities,
    wherein said duality of rotary metallic discs have an electrically conducting nature and said duality of rotary metallic discs are positioned to form an annular space of predetermined distance,
  b) a plurality of carbon brushes in communication with the first disc and the second disc,
  c) a high voltage power source, connected to the plurality of carbon brushes, capable of applying prescribed high voltage between said first disc and said second disc and charging said first disc and said second disc with opposing polarities to create a corona discharge,
  d) a supporting structure assembly, rotatably disposed within the enclosing chamber, further comprising of a rotatable shaft onto which said duality of rotary metallic discs are fixedly mounted for rotation in a plane perpendicular to said shaft parallely and coaxially,
  e) a power source mounted on the exterior of the enclosing chamber for driving the rotational movement of the supporting structure assembly,
  f) a stationary horizontal support member non-removably attached to the supporting structure assembly at one end,
  g) a first wiper, non-removably affixed to the supporting structure assembly, in contact with a surface of the first disc,
  h) a second wiper, non-removably affixed to the supporting structure assembly, in contact with a surface of the second disc,
    wherein the first wiper and the second wiper comprise a thermo elastomeric polymer material,
  i) a separation chamber, integrally coupled to the lower portion of the enclosing chamber, wherein the separation chamber further comprises a cyclone section, a collection section and an outlet pipe;
    said collection section further comprising of a removable tray positioned at the lower portion, and coupled to the cyclone section and said outlet pipe connected to the upper portion of the cyclone section for discharge of clean exhaust gases, and
  j) an electronic control unit comprising of a microcontroller system electrically linked to the motor and the power source for control of the charging and cleaning cycle at predetermined duration and predetermined frequency;
    wherein the enclosing chamber is stationary and vertically positioned and the first disc and the second disc rotate in a plane parallel to the inflow of the exhaust gas and the first wiper and the second wiper are stationary.

14. The device as claimed in claim 13, wherein the device is adapted to generate a notification by way of an audio alert, a visual alert, a Short Messaging Service (SMS) alert, or a combination of an audio, visual and a Short Messaging Service (SMS) alert and transmit the notification to a user or a communication device, when the weight of the agglomerated carbon particles in the collection section reaches a predetermined level.

15. The device as claimed in claim 14, wherein the communication device comprises at least one of a mobile phone, a personal computer, a smart phone, a cellular phone, a personal digital assistant (PDA), a GPS device, a smartbook, a netbook, a notebook, an ultra-mobile personal computer and a wearable computing device.

16. The device as claimed in claim 13, wherein the power source receives power from a renewable energy source including solar or wind energy.

17. A device for air pollution control, wherein carbon particulate matter present in exhaust gases generated in an open source pollution, is agglomerated, collected and separated and prevented from being directly emitted into the atmosphere, having steps of charging and cleaning at predetermined duration and frequency, comprising:
  a) a vertical tower provided with an inlet mesh, an induced draft fan, a first hollow cylinder,
    wherein said first hollow cylinder has an electrically conducting nature and is housed in the central position of the vertical tower,
  b) a second cylinder disposed coaxially within the first hollow cylinder, to form an annular space of predetermined distance,
    wherein said cylinder has an electrically conducting nature;
  c) a plurality of carbon brushes in communication with the first cylinder and the second cylinder,
  d) a high voltage power source, connected to the plurality of carbon brushes, capable of applying prescribed high voltage between said first cylinder and said second cylinder and charging said first cylinder and said second cylinder with opposing polarities to create a corona discharge,
  e) a supporting structure assembly, rotatably disposed within the first cylinder, wherein said supporting structure assembly, further comprising three parallel pipe members designated as an outer member, a central member and an inner member, such that the central member is disposed axially and non-removably within the second cylinder, f) a power source coupled to the central member for driving the rotational movement of the supporting structure assembly,
g) a stationary vertical support member non-removably attached to the first cylinder and connected to the supporting structure assembly at one end,
h) a first wiper, non-removably affixed to a longitudinal edge of the outer member, in contact with an external surface of the second cylinder,
i) a second wiper, non-removably affixed to a longitudinal edge of the inner member, in contact with an internal surface of the first cylinder,
   wherein the first wiper and the second wiper comprise a thermo elastomeric polymer material,
j) a separation chamber, integrally coupled to the lower portion of the first cylinder, wherein the separation chamber further comprises a cyclone section, a collection section and an outlet pipe;
   said collection section further comprising a removable tray positioned at the lower portion, and coupled to the cyclone section and said outlet pipe connected to the upper portion of the cyclone section for discharge of clean exhaust gases;
k) an electronic control unit comprising a microcontroller system electrically linked to the motor and the power source for control of the charging and cleaning cycle at predetermined duration and predetermined frequency;
   wherein the vertical tower is vertically positioned and perpendicular to the inflow of the exhaust gas, the first cylinder and the second cylinder are stationary and the first wiper and the second wiper rotate.

18. The device as claimed in claim 17, wherein the device is adapted to generate a notification by way of an audio alert, a visual alert, a Short Messaging Service (SMS) alert, or a combination of an audio, visual and a Short Messaging Service (SMS) alert and transmit the notification to a user or a communication device, when the weight of the agglomerated carbon particles in the collection section reaches a predetermined level.

19. The device as claimed in claim 18, wherein the communication device comprises at least one of a mobile phone, a personal computer, a smart phone, a cellular phone, a personal digital assistant (PDA), a GPS device, a smartbook, a netbook, a notebook, an ultra-mobile personal computer and a wearable computing device.

20. The device as claimed in claim 17, wherein the power source receives power from a renewable energy source including solar or wind energy.

* * * * *